Dec. 15, 1970   H. U. HAUSER-LIENHARD   3,546,867
HAY HARVESTING MACHINE
Filed July 15, 1968   2 Sheets-Sheet 1

INVENTOR.
Hans Ulrich Hauser-Lienhard
BY
ATTYS.

Dec. 15, 1970  H. U. HAUSER-LIENHARD  3,546,867
HAY HARVESTING MACHINE
Filed July 15, 1968  2 Sheets-Sheet 2

INVENTOR.
Hans Ulrich Hauser Lienhard
BY
ATTYS.

3,546,867
HAY HARVESTING MACHINE
Hans Ulrich Hauser-Lienhard, Watt, Zurich, Switzerland, assignor to Bucher-Guyer AG Maschinenfabrik, Zurich, Switzerland
Filed July 15, 1968, Ser. No. 744,980
Claims priority, application Switzerland, July 14, 1967, 10,058/67
Int. Cl. A01d 79/00
U.S. Cl. 56—370                                                          11 Claims

ABSTRACT OF THE DISCLOSURE

A hay harvesting machine having at least one rake wheel rotatably driven about an upright tubular shaft and supported on the ground by means of one or more support rolls. The rake wheel comprises pivoting prong carriers the position of which is controlled by a cam track arranged within a wheel casing and cam followers secured to the prong carriers, so that the prongs act on the hay lying on the ground or are raised above the ground into inoperative position. The tubular shaft forms a central support for the cam track and a central bearing for a rotatable casing portion carrying said prong carriers. An adjusting member extends through said tubular shaft and is operable from above the shaft to vary the level of the cam track or the support roll.

---

This invention relates to a hay harvesting machine having at least one rake wheel rotatably driven about an upright shaft and travelling on the ground by means of at least one supporting roll, the rake wheel including prong carriers controrlled by a cam track arranged within a wheel casing, so that the rake prongs, in a zone of their movement of rotation, effect an upward pivoting movement in a direction opposite their movement of rotation.

According to the invention the upright shaft is formed as a tubular shaft and forms a central support for the cam track and a central bearing for a rotatable casing portion, the tubular shaft being arranged to guide an adjusting member operable from above said wheel casing to vary the level of said supporting roll and/or of the cam track.

Further details and advantages of the invention will result from the following specification with reference to the accompanying drawings illustrating two embodiments of a hay harvesting machine according to the invention.

Figure 1:
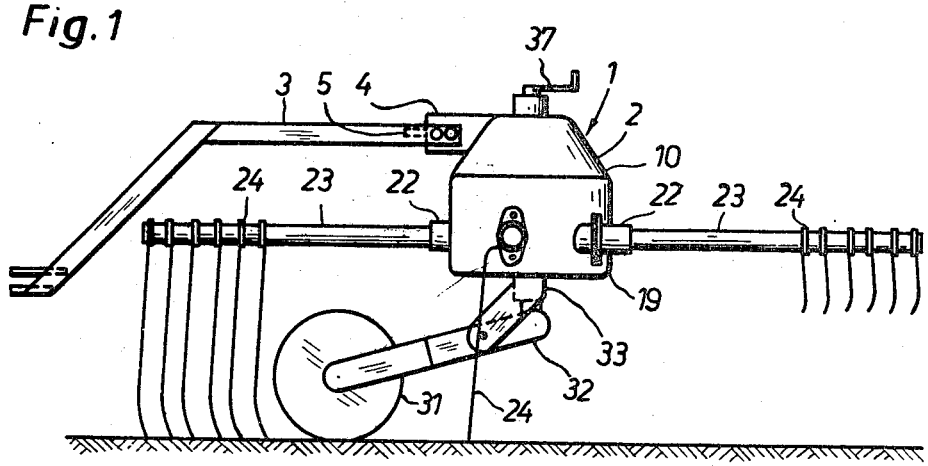
FIG. 1 is a view in elevation of a rake wheel of the hay harvesting machine.

As shown in FIG. 1, the hay harvesting machine comprises a rake wheel 1 which can be attached to a tractor by means of a centre pole 3 fixed to a wheel casing 2. The wheel 1 is drivingly connected by a primary shaft 5, rotatably mounted in a bearing 4 on the wheel casing 2, with the tap shaft of the traction engine of the harvester, by the intermediary of a universal joint shaft.

A casing cover 7 (FIG. 2) fixed to the upper end of a tubular shaft 6 and a lateral wall 9 fixed by screws 8 to the cover 7 form together an upper stationary casing half 10 of the wheel casing 2. A cylinder 13 is rotatably guided by a rim 12 in an annular groove 11 between the casing cover 7 and the lateral wall 9. The cylinder has its lower end formed with a U-shape section cam track 14 centrally arranged with respect to the tubular shaft 6. The cylinder is provided at its rim 11 with a fixed bolt 15 which traverses a uniform slot provided in the casing cover 7. A regulating lever 16 is connected with the bolt 15 and carries a locking pin 17 which can engage either one of several holes provided in the casing cover, whereby the cylinder 13 together with the control track 14 can be turned relative to the casing cover 7 and adjusted into different angular positions.

A lower casing half 19 of the wheel casing 2 is mounted in two radial bearings 18 on the tubular shaft 6. The lower casing half 19 is rotatably driven by means of the primary shaft 5, a bevel wheel 20 and a spur bevel gear 21 fixed to the lower casing half 19.

The lower casing half comprises a plurality of bearing sleeves 22 on its side wall, in which prong carriers 23 are rotatably mounted. These prong carriers comprises a carrier tube 25 provided with rake prongs 24, fitted over a bearing pin 27 by means of a slotted connecting sleeve 26 and detachably connected to the pin 27 by means of a tightening screw 28. At their ends penetrating into the lower casing half 19 the bearing pins 27 of the prong carriers 23 carry crank arms 29 having cam follower heads 30 rotatably mounted on the arms and engaging into the cam track 14. This cam track extends in a substantially horizontal plane over a certain range of control and when the lower casing half is rotating, it guides the prong carriers into raking position, in which the ends of the prongs 24 make contact with a plane working surface as shown in FIG. 1 with the prong carrier 23 drawn at the left hand side. The prong carrier 23 represented on the right hand side in FIGS. 1 and 2 has turned about its own axis while its cam follower head 30 traveled in an upwardly inclined section of the cam track and accordingly caused its associated rake prongs 24 to pivot upwardly away from the working surface and out of raking position in a direction opposite to the rotary traveling direction.

The rake wheel 1 is supported by a support roll 31 which is pivotally connected by means of a two armed fork 32 with an arm 33 fixed to a sleeve 34 which is anchored to the tubular shaft 6. The sleeve 34 supporting the lower radial bearing 18 is secured against rotation on the tubular shaft 6 by a key 35 and is held by a screw 36 against axial movement.

A spindle 40 rotatably mounted in the tubular shaft 6 by an upper sleeve 38 and by a lower collar 39 has a crank handle 37 fixed thereto above the wheel casing 2 and is provided with a threaded lower end 41 screwed into a nut member 42 rotatably mounted in the fork 32. By a rotation of the crank handle 37, the supporting roll 31 can be pivoted about the fulcrum point 33' of the fork 32 on the arm 33, so that the distance of the rake prongs 24 from the ground can be adjusted by a displacement in height of the roll 33.

As will be obvious to those skilled in the art, means may be provided for operating the adjusting member by connecting the rotatable spindle 40 through a chain and sprocket drive to an operating means for this chain and sprocket drive positioned adjacent the driver's seat of a tractor pulling the harvesting machine.

With a hay harvesting machine having several rake wheels 1 arranged successively in a row transversely to the direction of travel, each rake wheel 1 will be individually supported on the ground by a support roll 31. In a hay harvesting machine having only one rake wheel 1 this latter will be equipped with two support rolls 31, both support rolls mounted on an undercarriage being adjustable in height in common by the described adjusting device.

The wheel casing 2 can be of simple construction and of compact closed shape, the tubular shaft 6 forming the fixed carrier of the upper casing half 10 and the cam track 14 by the intermediary of the casing cover 7 and the cylinder 13; moreover the tubular shaft forms the bearing support of the rotary lower casing half 19 and further serves as a central passage for the spindle 40 through the casing 2.

Figure 3:
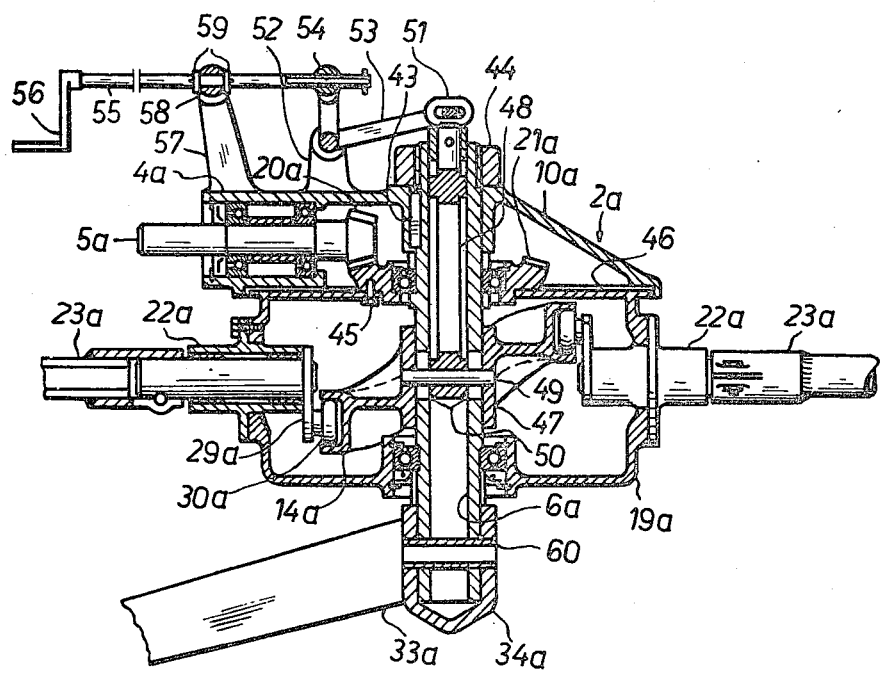
FIG. 3 is a similar view of a modified wheel casing of a rake wheel, having an adjusting device for the control track.

According to a further example of a rake wheel 1 shown in FIG. 3, a wheel casing 2a comprises an upper casing half 10a which is detachably connected for rotation with a tubular shaft 6a by means of a key 43 and a nut 44. An input shaft 5a extends into a bearing part 4a of this upper casing half 10a and carries a bevel wheel 20a meshing with a spur gear wheel 21a. The spur wheel 21a rotatably mounted on the tubular shaft 21a is connected by means of screws 45 for rotation with a partition wall 46 of a lower casing half 19a.

Prong carriers 23a mounted in bearing sleeves 22a of the lower casing half 19a are provided with crank arms 29a carrying rotatable cam follower heads 30a which engage a cam track 14a. The cam track is secured to a hub member 47 mounted for axial sliding movement on the tubular shaft 6a. A pull rod 48 is axially movable in the tubular shaft 6a and carries a cross bolt 49 at its lower end, which traverses two longitudinal slots 50 in the tubular shaft 6a and is connected with the hub 47.

The pull rod 48 is provided with an eye 51 at its upper end, which engages one arm of a bell crank lever 53 pivotally mounted on a bracket 52. The other, upwardly directed arm of the bell crank lever 53 is provided with a rotatable nut member 54 in which may be screwed a threaded rod 55. This rod 55 is formed with a crank handle 56 and traverses a pivot bearing 58 arranged on a support 57, the threaded rod 55 being held against longitudinal movement by means of abutments 59 on the pivot bearing.

When moving the crank on the threaded rod 55, the bell crank lever 53 is pivoted on the bracket 52, and according to the direction of rotation it moves the pull rod 48 in the tubular shaft 6a upwardly or downwardly, by taking along the cam track 14a, this vertical movement of the pull rod 48 being limited by the length of the longitudinal slots 50. By changing the position of the cam track 14a vertically, all prong carriers 23a turn together, whereby the basic position of all rake prongs 24 is changed. By means of a relatively small correction in height of the cam track 14a, the possibility exists to vary the basic position of the rake prongs 24a for accommodation to changing harvesting conditions. Moreover, the cam track 14a can be pulled upwards until the cross bolt 49 abuts against the upper end of the longitudinal slots 50. All rake prongs 24a are then swung upwardly to at least the height of the prong carriers 23a. The rake wheel thus is out of operation and the rakes are sufficiently spaced above the ground, so that the rake wheel can travel on a road.

Figure 2:
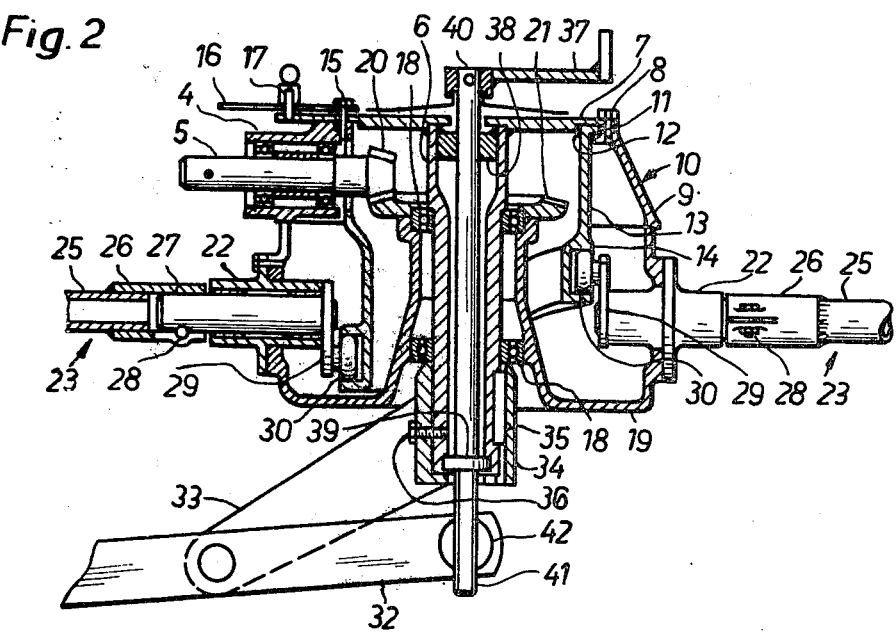
FIG. 2 is a vertical section through the wheel casing of the rake wheel according to FIG. 1, having an adjusting device for a supporting roll, and drawn to a large scale.

In the example according to FIG. 3 a support roll, not shown, is carried by an arm 33a rigidly connected to a sleeve 34a on the tubular shaft 6a by means of a cross pin 60. A possibility of adjustment of the cam track 14a and of the support roll could be devised by making for example the pull rod 48 extend with the lower end out of the tubular shaft and act on a pivotally mounted, two-armed fork of a support roll, as shown in FIG. 2.

In this example a possibility of adjustment of the position of the cam track 14a in the direction of rotation is not represented. Such an adjustment, however, could be obtained in simple manner by having the longitudinal slots 50 of the tubular shaft 6a extend obliquely instead of vertically. In this case, a longitudinal movement of the pull rod 48 would result in a combined axial and rotary movement of the cam track 14a. Further, a construction can be imagined in which the longitudinal slots 50 would be replaced by horizontal, circumferential slots, and the pull rod 48 by a rod which can be turned about its axis. By means of such a twisting rod and a cross bolt inserted therein and guided in the circumferential slots of the tubular shaft, the cam track would be adjustable in the direction of rotation.

I claim:
1. A hay harvesting machine having at least one rake wheel rotatably driven about an upright shaft and travelling on the ground on at least one support roll, the rake wheel including prong carriers controlled by a cam track arranged within a wheel casing and causing the rake prongs, in one zone of their rotary movement, to effect an upward pivoting movement away from the ground in a direction opposite to their movement of rotation, wherein said upright shaft is tubular and forms a central support of said cam track and a central bearing of a rotating part of the wheel casing, an adjusting member operable from above said wheel casing and extending axially through said tubular shaft for varying the height of said cam track above the ground.

2. A hay harvesting machine according to claim 1, in which an upper casing half of said wheel casing is fixedly mounted on said tubular shaft, and a lower casing half of the wheel casing is rotatably mounted on the tubular shaft.

3. A hay harvesting machine according to claim 1, in which said cam track is indirectly carried by the tubular shaft.

4. A hay harvesting machine according to claim 1 in which the cam track is provided with a hub mounted directly on the tubular shaft.

5. A hay harvesting machine according to claim 1, in which said adjusting member is formed by a spindle rotatably mounted in the tubular shaft.

6. A hay harvesting machine according to claim 1, in which the adjusting member is formed by a pull rod axially movable in said tubular shaft.

7. A hay harvesting machine according to claim 5, in which said spindle is provided with a crank handle above the wheel casing and is screwed below the tubular shaft into a nut portion of a pivoting two-armed fork carrying a rake wheel.

8. A hay harvesting machine according to claim 6, in which the cam track is held against rotation but axially movable on the tubular shaft and is axially adjustable by means of said pull rod.

9. A hay harvesting machine according to claim 8, in which the cam track is axially adjustable by means of a bell crank lever pivotally mounted on the wheel casing and connected to the pull rod.

10. A hay harvesting machine according to claim 9, in which said bell crank lever is pivoted by means of a threaded rod provided with a crank handle.

11. A hay harvesting machine according to claim 1, in which said adjusting member is actuable by means of a linkage to be operated from the seat of the tractor pulling the harvesting machine.

References Cited

UNITED STATES PATENTS

| 84,257 | 11/1868 | Burt et al. | 56—370 |
| 458,093 | 8/1891 | Boals | 56—370 |

FOREIGN PATENTS

| 450,793 | 4/1968 | Switzerland | 56—370 |
| 458,822 | 8/1968 | Switzerland | 56—370 |
| 458,823 | 8/1968 | Switzerland | 56—370 |
| 459,641 | 9/1968 | Switzerland | 56—370 |

LOUIS G. MANCENE, Primary Examiner

J. A. OLIFF, Assistant Examiner